(12) United States Patent
Carlson (10) Patent No.: US 9,440,805 B2
(45) Date of Patent: Sep. 13, 2016

(54) SEED CONTAINER RACK SYSTEM

(71) Applicant: Mathew G. Carlson, Cleveland, ND (US)

(72) Inventor: Mathew G. Carlson, Cleveland, ND (US)

(*) Notice: Subject to any disclaimer, the term of this patent is extended or adjusted under 35 U.S.C. 154(b) by 246 days.

(21) Appl. No.: 14/270,922

(22) Filed: May 6, 2014

(65) Prior Publication Data

US 2015/0320235 A1 Nov. 12, 2015

(51) Int. Cl.
| | |
|---|---|
| *B65D 88/32* | (2006.01) |
| *B65G 65/34* | (2006.01) |
| *B65G 65/42* | (2006.01) |
| *A47F 1/03* | (2006.01) |
| *B65G 65/40* | (2006.01) |

(52) U.S. Cl.
CPC .............. *B65G 65/42* (2013.01); *A47F 1/03* (2013.01); *B65G 65/40* (2013.01)

(58) Field of Classification Search
CPC .............. A47F 1/02; A47F 1/03; A47F 1/08; A01F 25/14; B65G 65/40; B65G 3/04; B65G 47/00; B65G 47/02; B65G 47/18; B65G 47/1407; B65G 47/1412; B65G 47/16; B65G 47/62; B65G 11/026
USPC ........ 414/403, 414, 615; 198/133, 448, 540, 198/541; 222/180, 180.1, 184, 185.1, 129
See application file for complete search history.

(56) References Cited

U.S. PATENT DOCUMENTS

| | | | | |
|---|---|---|---|---|
| 1,942,895 A | * | 1/1934 | Jones ..................... | A47F 1/03 222/130 |
| 3,822,056 A | * | 7/1974 | Hawes, Jr. .......... | B01F 15/0441 119/57.1 |
| 5,121,989 A | * | 6/1992 | Horton .................. | B28C 9/0418 366/18 |
| 7,500,817 B2 | * | 3/2009 | Furrer .................. | A01C 15/003 198/311 |
| 7,588,405 B2 | | 9/2009 | Johnson | |
| 8,397,897 B2 | | 3/2013 | Bastian, II | |
| 8,585,341 B1 | * | 11/2013 | Oren ...................... | B65G 65/42 222/181.1 |
| 8,686,341 B2 | * | 4/2014 | Noiret ................ | H04N 5/35536 250/208.1 |
| 2012/0275888 A1 | | 11/2012 | Claussen | |

OTHER PUBLICATIONS www.buckhorninc.com/products/specialty-boxes/centerflow.aspx; CenterFlow Container website by Buckhorn; Received and Printed Apr. 24, 2014.
www.buckhorninc.com/industries/seed.aspx; Seed Industry website by Buckhorn; Received and Printed Apr. 24, 2014.
www.willmarfab.com/sm80; SM80 Bulk Seed Containers website by Willmar Fabrication, LLC; Received and Printed Apr. 24, 2014.

(Continued)

*Primary Examiner* — Patrick Maestri
(74) *Attorney, Agent, or Firm* — Neustel Law Offices; Michael S. Neustel (57) ABSTRACT

A seed container rack system for dispensing a selected variety of seeds from a plurality of seed containers. The seed container rack system generally includes a support frame having a lower frame for supporting at least one lower seed container and an upper frame for supporting at least one upper seed container above the upper edge of the lower seed container. A lower conveyor is positioned within a lower portion of the support frame to receive seed from the lower seed container and the upper seed container. A chute having an upper end and a lower discharge end extends from beneath the upper seed container to a side of the lower seed container to transfer the seed from the upper seed container to the lower conveyor.

18 Claims, 11 Drawing Sheets

(56) References Cited

OTHER PUBLICATIONS www.bulkseedsystems.com/index.php/products/pro-chutes; Bulk Seed Pro-Chute 2 website by Bulk Seed Systems, Inc.; Received and Printed Apr. 24, 2014.

www.bulkseedsystems.com/index.php/products/stands; 222D and 222S Stands website by Bulk Seed Systems, Inc.; Received and Printed Apr. 24, 2014.

www.umequip.com/literature/pdf/Seed-Pro-Bulk-Box-Tender.pdf; Seed Pro Bulk Box Seed Tenders PDF by Unverferth Seed Tenders; Received and Printed Apr. 24, 2014.

www.tricorpusa.com/seed-handeling-equipment.html; Bulk Seed Handling / Seed Jet II website by Tricorp USA; Received and Printed Apr. 24, 2014.

www.universalpackage.com/ag/seed/feed/salt-box-copy/; Spare Parts & Accessories for Flow Container website by Universal Package Systems; Received and Printed Apr. 24, 2014.

www.jm-inc.com/literature/speedtender_series.pdf; SpeedTender Seed Delivery System PDF by J&M Manufacturing Co.; Received and Printed Apr. 24, 2014.

www.crustbuster.com/seed-box-totes; Seed Box Totes website by CrustBuster Speed King Inc.; Received and Printed Apr. 23, 2014.

\* cited by examiner

SEED CONTAINER RACK SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a seed handling system and more specifically it relates to a seed container rack system for dispensing a selected variety of seeds from a plurality of seed containers.

2. Description of the Related Art

Any discussion of the related art throughout the specification should in no way be considered as an admission that such related art is widely known or forms part of common general knowledge in the field.

Seed containers (a.k.a. bulk seed containers, seed boxes) have been in use for years for storing, transporting and dispensing agricultural seeds for treatment and planting. The seed containers are typically constructed of a box type of structure having an upper opening, four sidewalls, a floor, a discharge opening within the floor to selectively release the seed within the seed container and a slide discharge door accessible from the side to allow for control of the flow of seed through the discharge opening. A lid or cover may be positioned over the upper opening to protect to the seed within the seed container. The slide discharge door is allowed to be opened by releasing a slide discharge door latch whereby the user is able to pull out the slide discharge door into an open position which allows the seed to flow through the discharge opening. When the user desires to stop the flow of seed through the discharge opening, the user pushes the slide discharge door inwardly into a closed position thereby completely blocking the discharge opening. The floor is typically tapered inwardly toward the discharge opening to allow for complete removal of the seed from the seed container. Most seed containers are constructed of plastic materials but may be constructed of metal. The seed containers are lifted and moved utilizing a forklift, pallet jacks or other motorized lifting system.

Examples of exemplary seed containers include the following seed containers: SEED MOBILE SM80 seed containers by Willmar Fabrication, LLC, PROBOX seed containers manufactured by Pioneer Hi-Bred International, Inc., and CENTERFLOW seed containers by Buckhorn, Inc.

To release the seed from a seed container, the seed container is typically elevated with a forklift and the user discharges the seed from the bottom of the seed container through a lower opening into other agricultural equipment. The user selects the seed container with the desired seed to be dispensed, lifts the seed container and then dispenses the seed from the container to the agricultural equipment (e.g. a planter, grain truck). One type of product created to assist in guiding the discharged seed is a chute that attached to the bottom of the seed container which directs seed to the planter or other agricultural equipment such as PRO I and PRO II chutes manufactured by Bulk Seed Systems, Inc. However, chutes can only be attached to a single seed container and still require the user to lift a selected seed container.

Seed tenders have been developed recently wherein a plurality of seed containers are supported upon a frame in a single row with a conveyor positioned below the frame to transport seed released from one or more seed containers. U.S. Pat. No. 8,696,296 to Claussen titled "Seed Tender" provides an exemplary illustration of a conventional seed tender. The main problem with conventional seed tenders is that they are limited to a single row of seed containers and therefore are further limited in the number of seed containers capable of being stored and used by the width of the frame and available space. Hence, conventional seed tenders are limited in the volume of seed and the number of varieties of seed they are capable of storing.

Because of the inherent problems with the related art, there is a need for a new and improved seed container rack system for dispensing a selected variety of seeds from a plurality of seed containers.

BRIEF SUMMARY OF THE INVENTION

The invention generally relates to a seed dispenser which includes a support frame having a lower frame for supporting at least one lower seed container and an upper frame for supporting at least one upper seed container above the upper edge of the lower seed container. A lower conveyor is positioned within a lower portion of the support frame to receive seed from the lower seed container and the upper seed container. A chute having an upper end and a lower discharge end extends from beneath the upper seed container to a side of the lower seed container to transfer the seed from the upper seed container to the lower conveyor.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 9d illustrate a seed container rack system 10, which comprises a support frame 30 having a lower frame 40 for supporting at least one lower seed container 20 and an upper frame 50 for supporting at least one upper seed container 21 above the upper edge of the lower seed container 20. A lower conveyor 80 is positioned within a lower portion of the support frame 30 to receive seed from the lower seed container 20 and the upper seed container 21. A chute having an upper end and a lower discharge end 76 extends from beneath the upper seed container 21 to a side of the lower seed container 20 to transfer the seed from the upper seed container 21 to the lower conveyor 80.

B. Seed Container.

FIGS. 1, 2, 7 through 9d illustrate an exemplary seed container 20, 21 that is comprised of a portable structure that is capable of storing, transporting and dispensing a volume of seed (e.g. soybean seed, wheat seed). The seed containers 20, 21 may be comprised of various sizes, shapes, structures and configurations. The seed containers 20, 21 may be comprised of any conventional seed containers (a.k.a. bulk seed containers, seed boxes) that is capable of storing, transporting and dispensing agricultural seeds for treatment and planting.

As illustrated in FIGS. 1, 2, 7 through 9d of the drawings, the exemplary seed containers 20, 21 suitable for usage within the present invention are constructed of a box type of structure having an upper opening 22, four sidewalls 24, a floor 26, a discharge opening 28 within the floor 26 to selectively release the seed within the seed container and a slide discharge door 25 accessible from the side to allow for control of the flow of seed through the discharge opening 28. Various other seed flow control devices (e.g. valve) may be utilized instead of a slide discharge door 25 to control the flow of seed through the discharge opening 28. A lid or cover may be positioned over the upper opening 22 to protect to the seed within the seed container. The slide discharge door 25 is allowed to be opened by releasing a slide discharge door 25 latch whereby the user is able to pull out the slide discharge door 25 into an open position which allows the seed to flow through the discharge opening 28. When the user desires to stop the flow of seed through the discharge opening 28, the user pushes the slide discharge door 25 inwardly into a closed position thereby completely blocking the discharge opening 28. The floor 26 is typically tapered inwardly toward the discharge opening 28 to allow for complete removal of the seed from the seed container. The seed containers 20, 21 are may be constructed of various types of materials such as but not limited to plastic. The seed containers 20, 21 are designed to allow for the forks of a forklift to be receive within a lower portion of the seed container 20, 21 thereby allowing the seed container 20, 21 to be lifted and moved utilizing a forklift, pallet jacks or other motorized lifting system.

Examples of exemplary seed containers 20, 21 suitable for usage with the present invention include the following seed containers 20, 21: SEED MOBILE SM80 seed containers by Willmar Fabrication, LLC, PROBOX seed containers manufactured by Pioneer Hi-Bred International, Inc., and CENTERFLOW seed containers by Buckhorn, Inc. U.S. Pat. No. 8,696,296 to Claussen titled "Seed Tender" illustrates exemplary seed containers suitable for usage within the present invention and is incorporated herein by reference.

C. Support Frame.

FIGS. 1 through 6 illustrate the support frame 30 that is adapted to support a plurality of seed containers 20, 21. The support frame 30 includes a plurality of support legs 32 that extend in a vertical manner. A lower frame 40 extends between and is attached to a lower portion of the support legs 32 as shown in FIGS. 1 through 5. An upper frame 50 extends between and is attached to an upper portion of the support legs 32 as further shown in FIGS. 1 through 5. While the drawings illustrate two levels of support for the seed containers using the lower frame 40 and the upper frame 50, it can be appreciated that an additional intermediate frame may be positioned between the lower frame 40 and the upper frame 50 to support one or more intermediate seed containers positioned between the lower seed containers 20 and the upper seed containers 21. For the remaining purposes of this discussion, the lower frame 40 and the upper frame 50 will be discussed.

Figure 1:
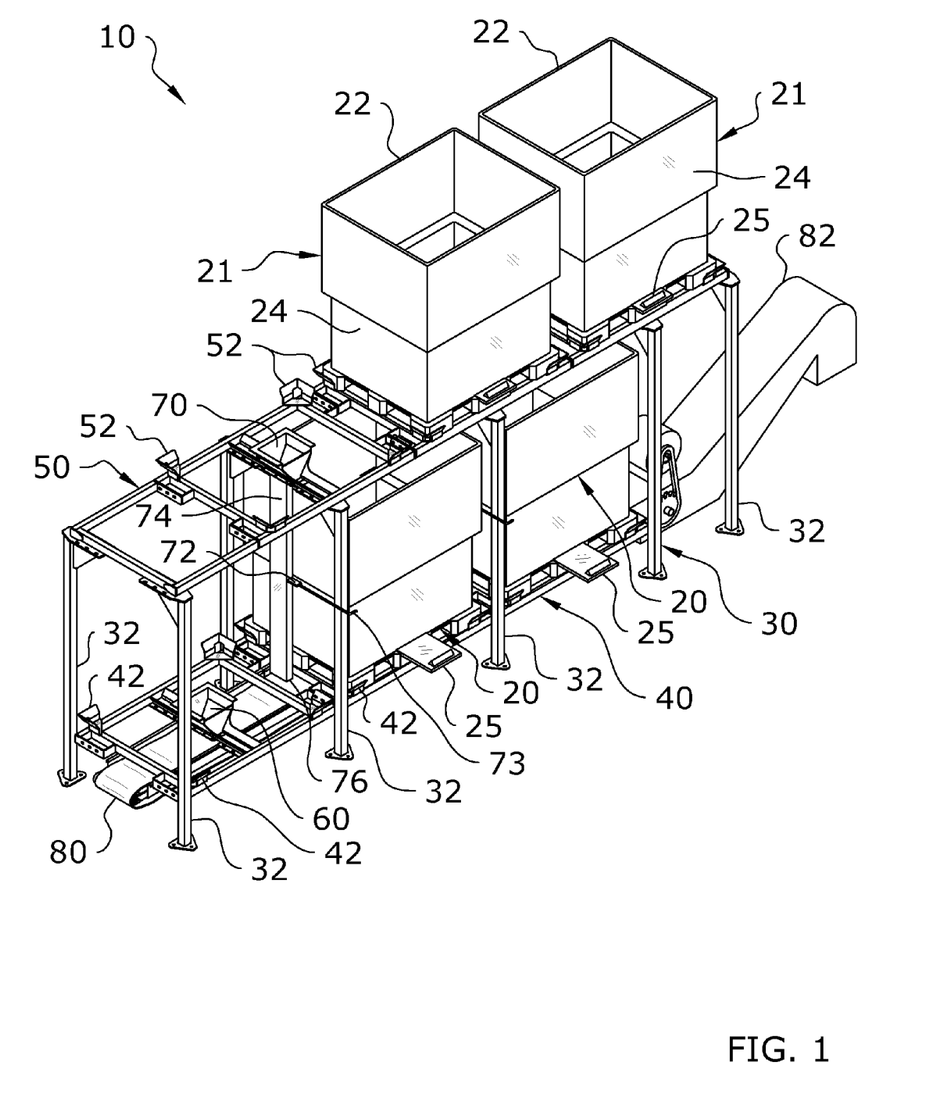
FIG. 1 is a rear upper perspective view of the present invention with a plurality of upper seed containers and a plurality of lower seed containers.
Figure 2:
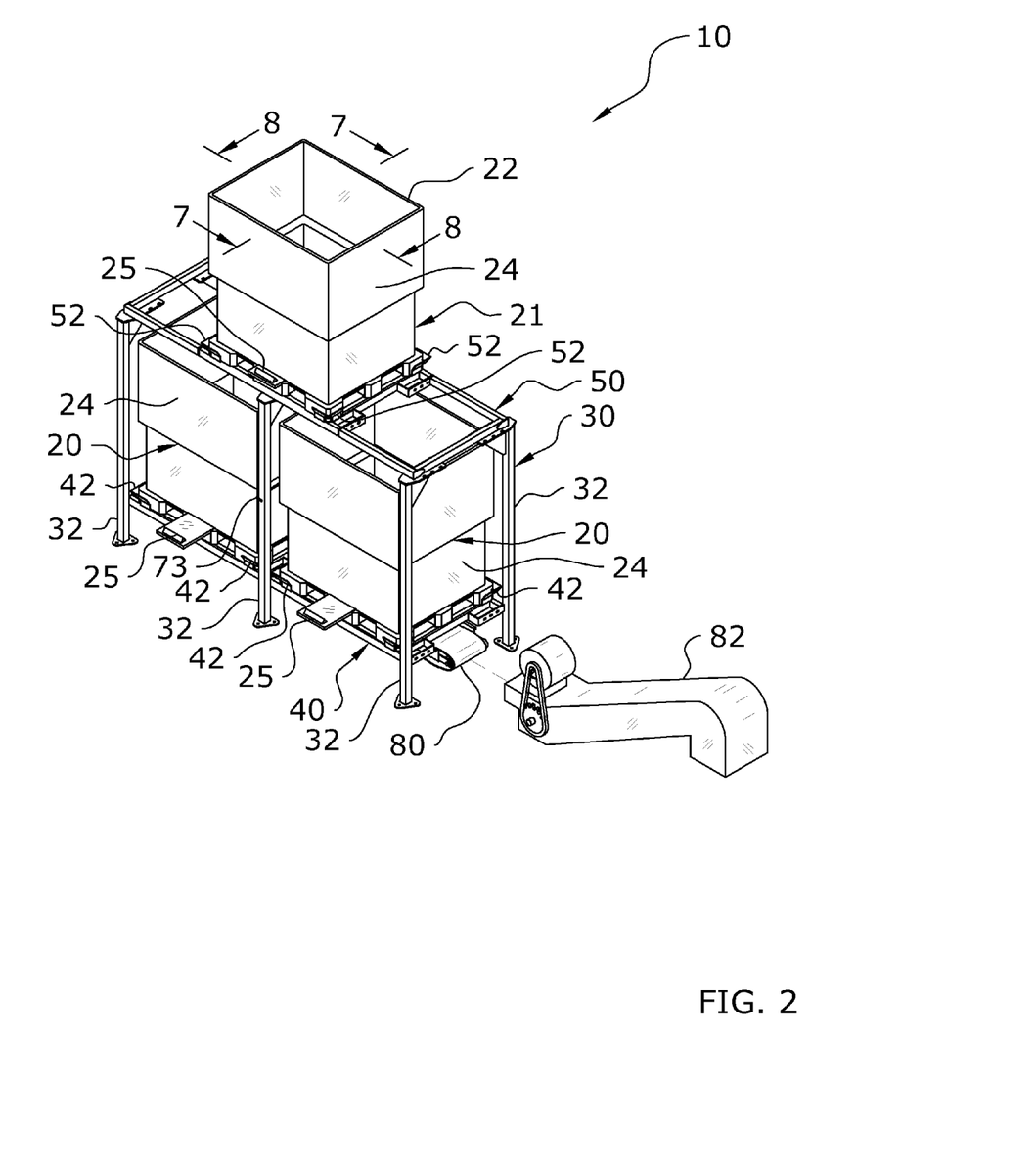
FIG. 2 is a front upper perspective view of the present invention supporting a plurality of seed containers.

The lower frame 40 is adapted to support at least one lower seed container 20 as shown in FIGS. 1 and 2 of the drawings. The lower frame 40 may be comprised of various support structures such as horizontal frame members extending between the support legs 32. The horizontal frame members of the lower frame 40 extending longitudinally along the length of the support frame 30 and crossways between the support legs 32.

Figure 8:
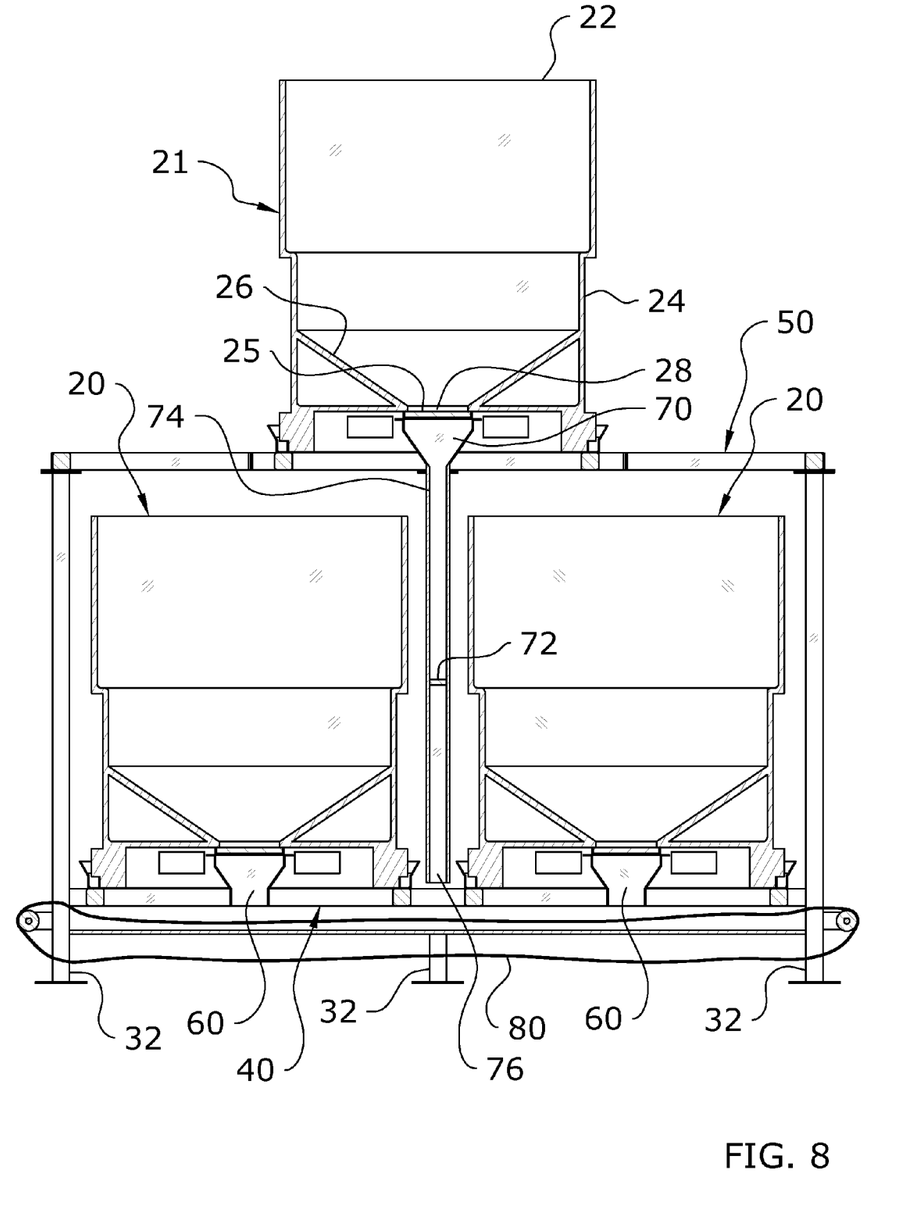
FIG. 8 is a cross sectional view taken along line 8-8 of FIG. 2.
Figure 9A:
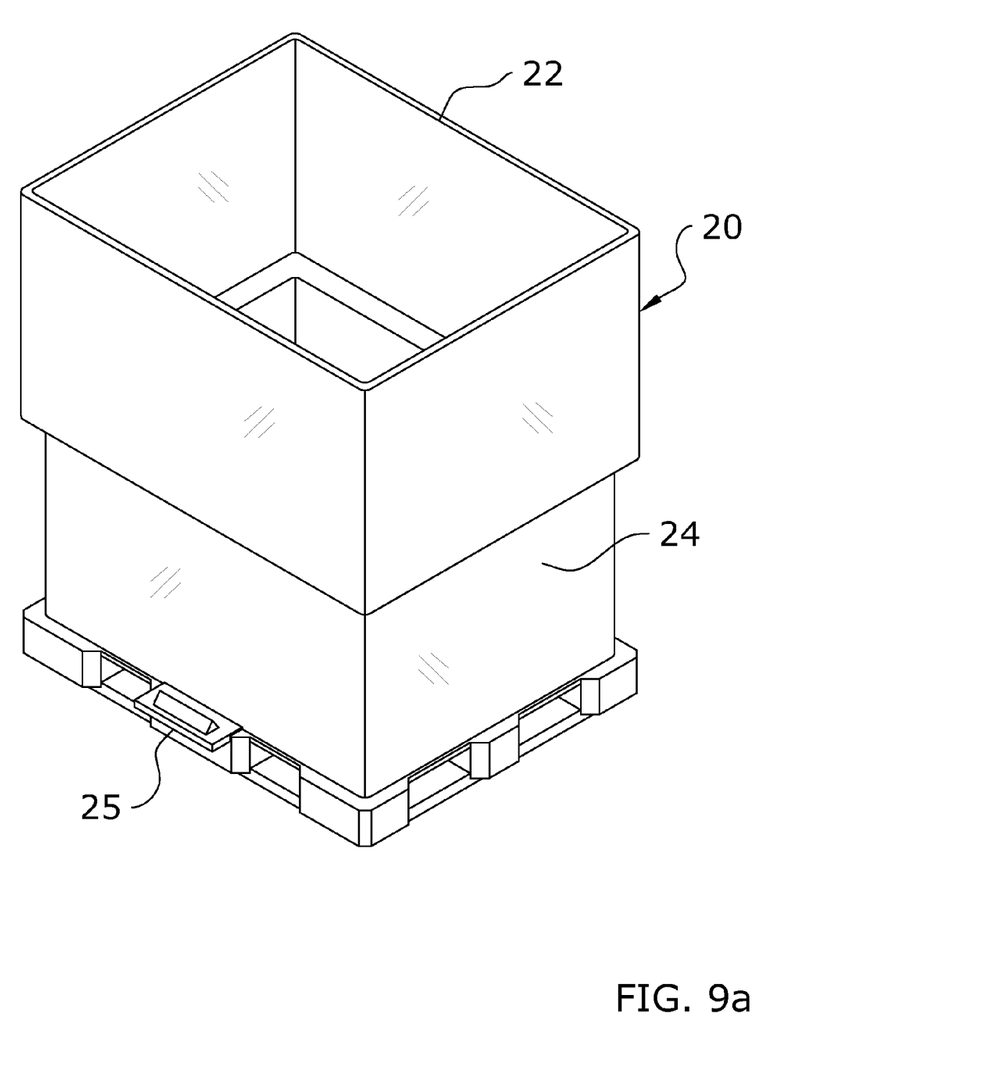
FIG. 9a is an upper perspective view of an exemplary seed container.
Figure 9B:
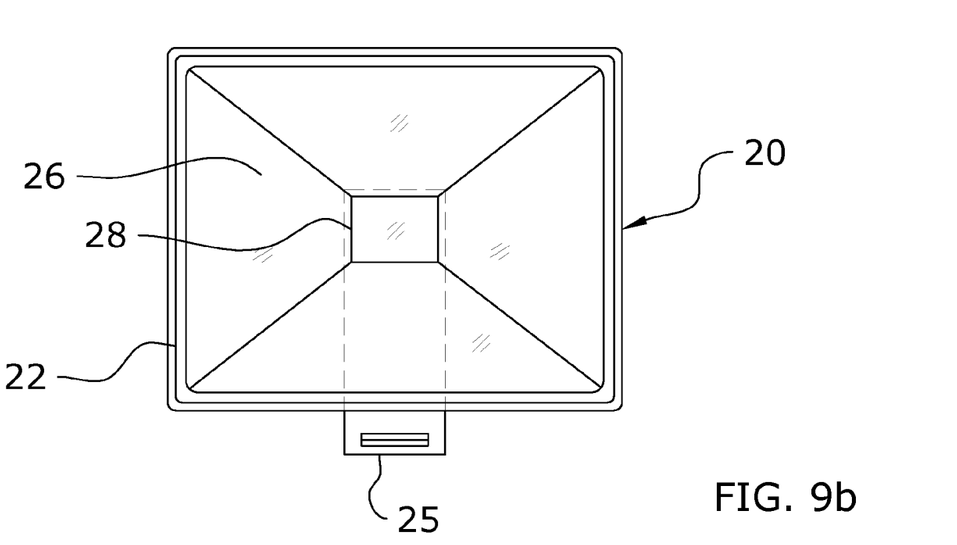
FIG. 9b is a top view of the exemplary seed container with the slide discharge door closed.
Figure 9C:
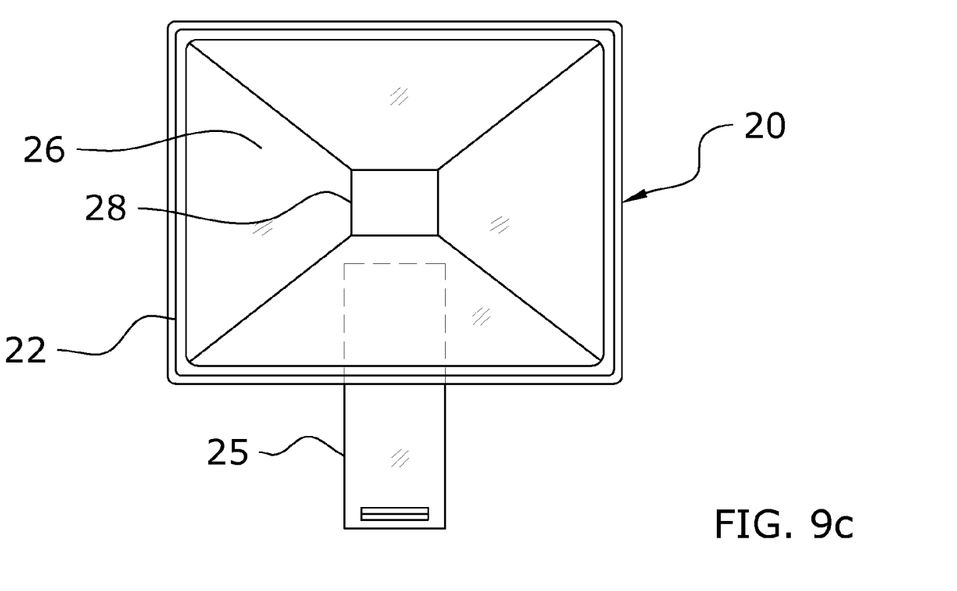
FIG. 9c is a top view of the exemplary seed container with the slide discharge door opened.
Figure 9D:
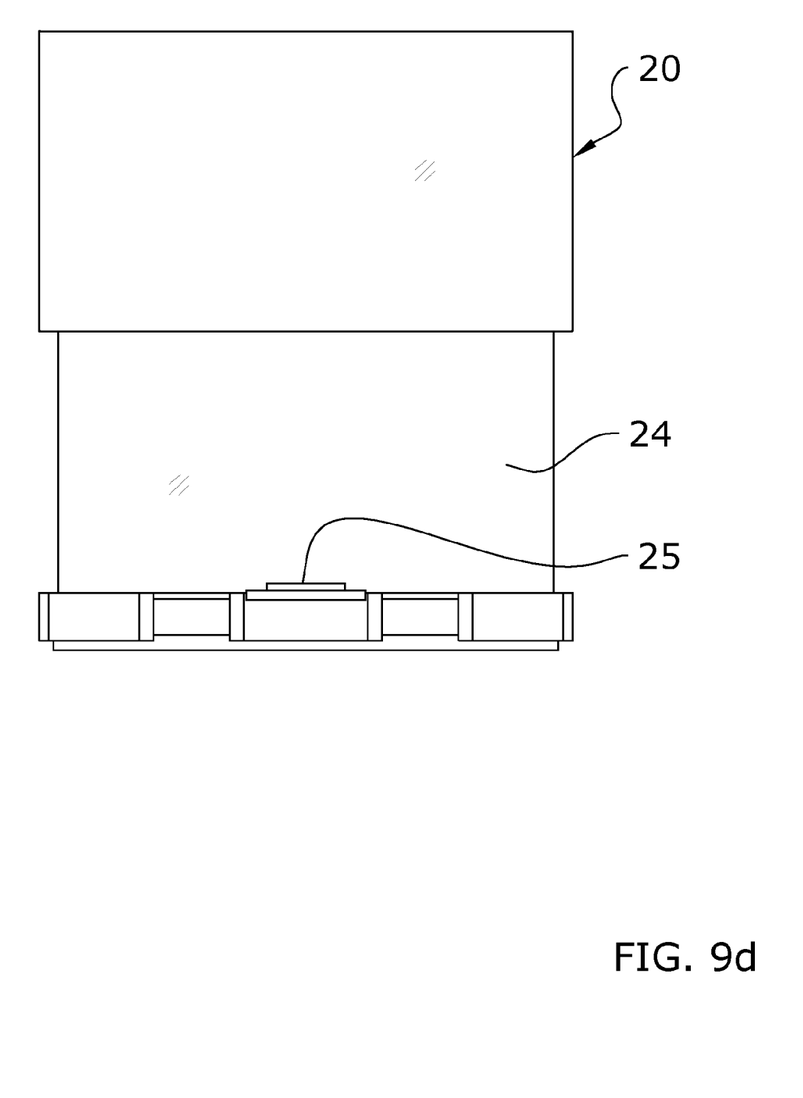
FIG. 9d is a side view of the exemplary seed container.

The lower frame 40 is preferably sufficient in strength and length to support a plurality of lower seed containers 20 as illustrated in FIGS. 1 and 2 of the drawings. The lower frame 40 preferably includes one or more sets of lower corner supports 42 attached to the lower support frame 30, wherein the lower corner supports 42 are formed to receive the lower corner portions of the lower seed containers 20. When a plurality of lower seed containers 20 are supported by the lower frame 40, the lower corner supports 42 are positioned to provide spacing between the adjacent lower seed containers 20 such that the discharge conveyor 74 has sufficient room to pass between a pair of the lower seed containers 20 as illustrated in FIGS. 1, 2 and 8 of the drawings. It is preferable that the spacing between the lower seed containers 20 when positioned upon the lower frame 40 is at least six inches or greater to accommodate a discharge conveyor 74 having a smaller size.

Figure 3:
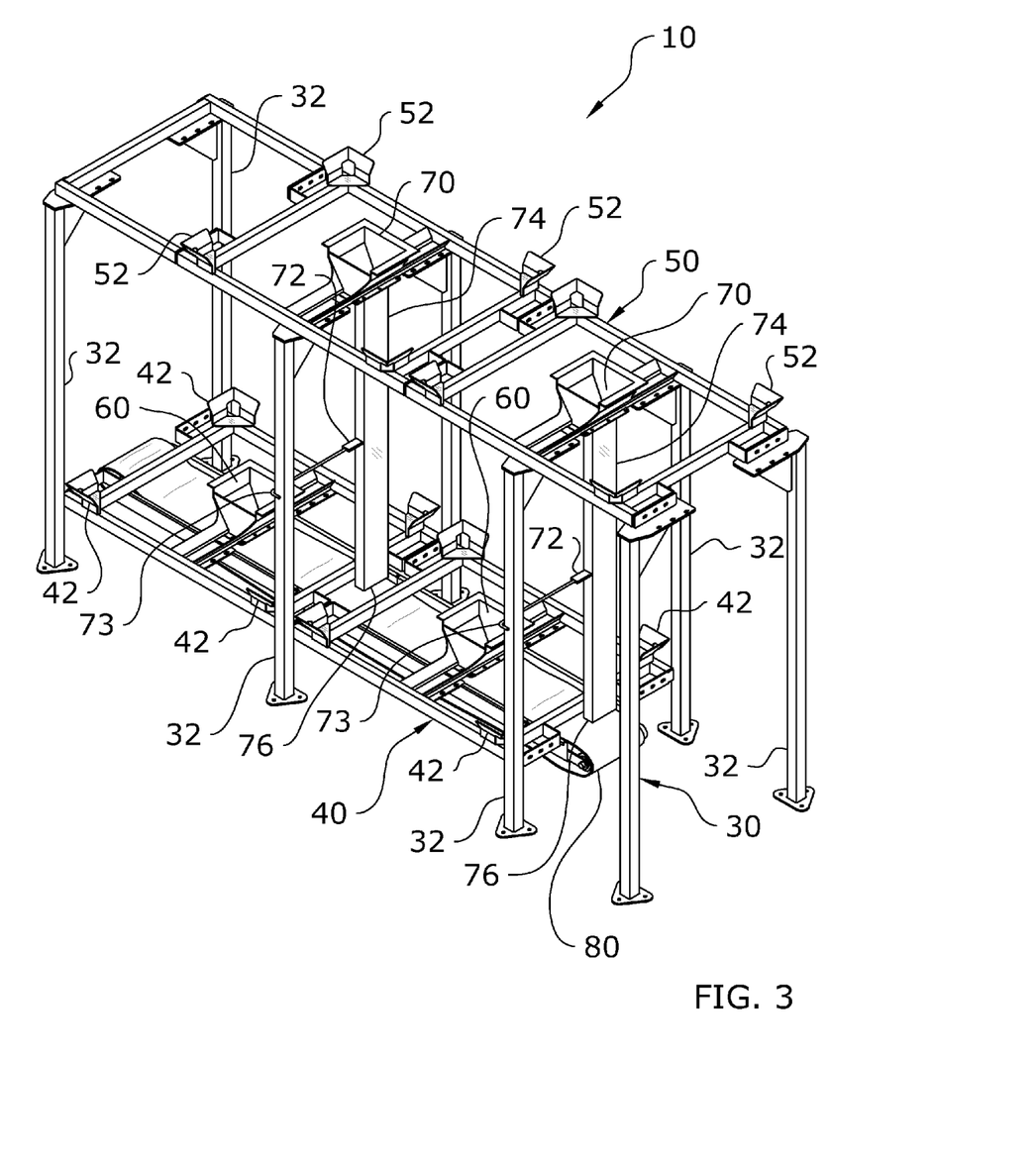
FIG. 3 is a front upper perspective view of the present invention without any seed containers supported.
Figure 4:
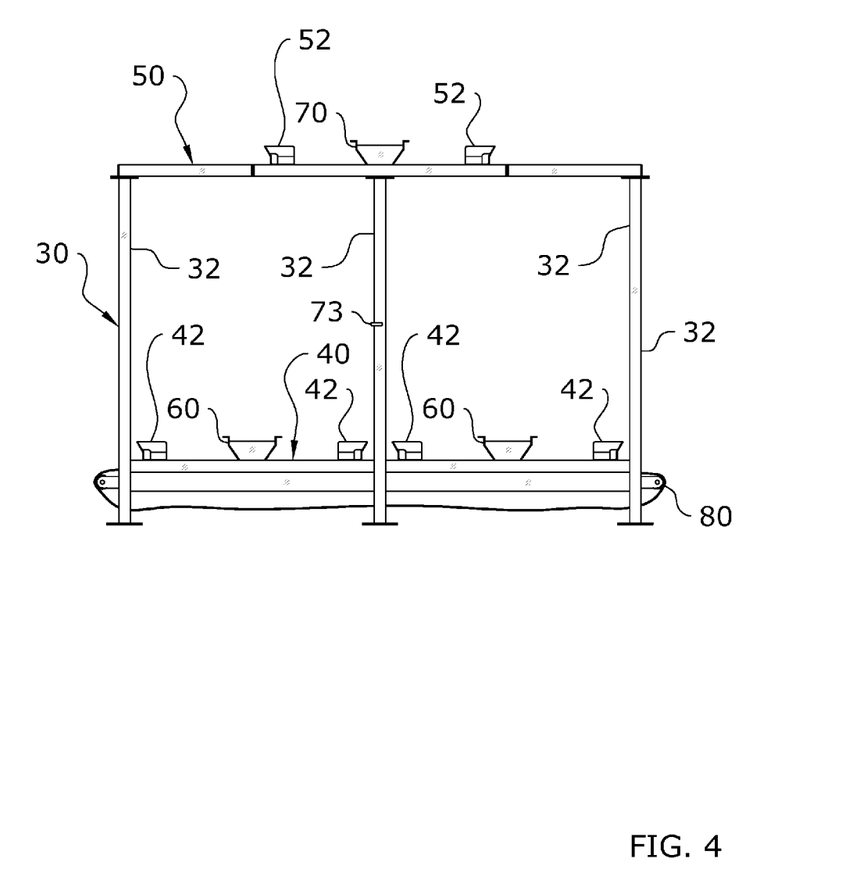
FIG. 4 is a side view of the present invention.

FIG. 3 best illustrates the lower corner supports 42 each having a pair of wall portions (preferably angled outwardly) extending upwardly in a vertical manner and a bottom member extending between the pair of wall portions to support the bottom of the lower seed container 20. There are preferably four lower corner supports 42 each positioned in a respective corner that corresponds to a lower corner of the lower seed container 20.

The lower seed containers 20 each have a discharge opening 28 that may be opened via the slide discharge door 25 (or other seed flow control device) thereby dispensing the seed directly onto the lower conveyor 80. It is preferable that a lower funnel 60 is attached to the lower frame 40 that is positioned beneath the discharge opening 28 of the lower seed container 20 thereby to guide seed dispensed from the lower seed container 20 to a central portion of the lower conveyor 80. The lower funnel 60 may include a lower door that is slidably connected within side channels of the lower funnel 60 to provide a secondary protection to prevent the entry seed onto the lower conveyor 80 only if the lower door is also opened with the slide discharge door 25 of the lower seed container 20.

The upper frame 50 is adapted to support at least one upper seed container 21 as shown in FIGS. 1 and 2 of the drawings. The upper frame 50 may be comprised of various support structures such as horizontal frame members extending between the support legs 32. The horizontal frame members of the upper frame 50 extending longitudinally along the length of the support frame 30 and crossways between the support legs 32.

The upper frame 50 is preferably sufficient in strength and length to support a plurality of upper seed containers 21 as illustrated in FIGS. 1 and 2 of the drawings. The upper frame 50 preferably includes one or more sets of upper corner supports 52 attached to the upper support frame 30, wherein the upper corner supports 52 are formed to receive the upper corner portions of the upper seed containers 21. FIG. 3 best illustrates the upper corner supports 52 each having a pair of wall portions (preferably angled outwardly) extending upwardly in a vertical manner and a bottom member extending between the pair of wall portions to support the bottom of the upper seed container 21. There are preferably four upper corner supports 52 each positioned in a respective corner that corresponds to an upper corner of the upper seed container 21. Each set of upper corner supports 52 is staggered with respect to a set of lower corner supports 42 of the lower frame 40.

As shown in FIGS. 1 and 2 of the drawings, the upper frame 50 supports the upper seed containers 21 above an upper end of the lower seed containers 20 in a distally spaced manner. The upper frame 50 is adapted to support the upper seed container 21 in a staggered and non-aligned position with respect to the lower seed container 20 as best illustrated in FIGS. 1 and 2 of the drawings. The upper frame 50 is also preferably adapted to support the upper seed container 21 so that a central vertical axis of the upper seed container 21 extends to a side of the lower seed container 20 thereby allowing the seed from the upper seed container 21 to fall directly between and/or to the side of the lower seed containers 20 through the discharge conveyor 74. The upper frame 50 is also adapted to support the upper seed containers 21 so that the discharge opening 28 of the upper seed containers 21 extend to a side of the lower seed containers 20 as shown in FIGS. 1, 2, 3 and 8 of the drawings.

D. Discharge Conveyor.

There are one or more discharge conveyors 74 connected to the support frame 30 to transfer the seed from the upper seed containers 21 to the lower conveyor 80. There are a corresponding number of discharge conveyors 74 as there are upper seed containers 21 since each upper seed container 21 preferably has its own discharge conveyor 74. The discharge conveyors 74 are preferably vertically aligned and parallel with respect to one another as illustrated in FIG. 3 of the drawings.

The discharge conveyor 74 has an upper open end and a lower discharge end 76. The upper open end is adapted to be aligned with and below a discharge opening 28 of the upper seed container 21 to transfer seed from the upper seed container 21. Once the seed is received from the upper seed container 21, the discharge conveyor 74 transfers the seed to the lower conveyor 80 or to another location. The discharge conveyor 74 is preferably comprised of a chute conveyor that is comprised of a tubular structure that allows gravity to pull the seed through the discharge conveyor 74. However, the discharge conveyor 74 may be comprised of other types of conveyors including but not limited to bucket conveyors, augers and the like.

The upper seed containers 21 each have a discharge opening 28 that may be opened via the slide discharge door 25 (or other seed flow control device) thereby dispensing the seed to the lower conveyor 80. It is preferable that an upper funnel 70 is attached to the upper frame 50 that is positioned beneath the discharge opening 28 of the upper seed container 21 thereby to guide seed dispensed from the upper seed container 21 to a central portion of the lower conveyor 80.

Figure 7:
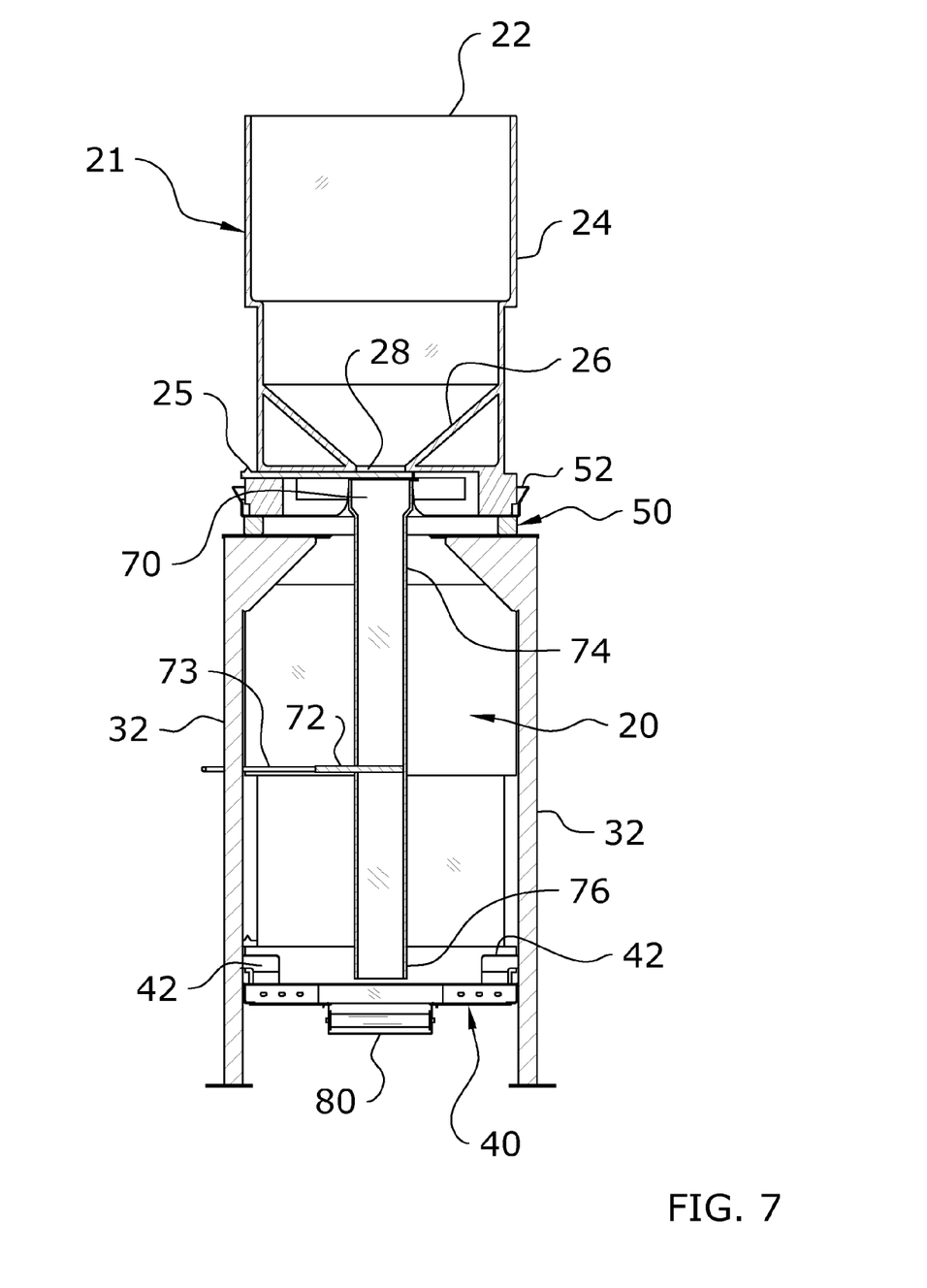
FIG. 7 is a cross sectional view taken along line 7-7 of FIG. 2.

The upper funnel 70 preferably includes a control valve 72 that is within the upper funnel 70 to provide a secondary protection to prevent the entry seed onto the lower conveyor 80 only if the control valve 72 is also opened with the slide discharge door 25 of the upper seed container 21. In particular, the control valve 72 is adapted to be selectively closed and opened thereby selectively closing/opening the discharge conveyor 74 accordingly. The control valve 72 is preferably comprised a sliding gate that is slidably connected through a slot within a side of the upper funnel 70 as best illustrated in FIG. 7 of the drawings. The control valve 72 further preferably includes a valve handle 73 connected to the control valve 72 to allow for manual opening and closing of the control valve 72 by the user. The valve handle 73 is preferably comprised of an elongated structure that extends outwardly from the control valve 72 and outside of the support frame 30 with a distal handle portion that is transverse with respect to the main portion of the valve handle 73.

E. Lower Conveyor.

Figure 5:
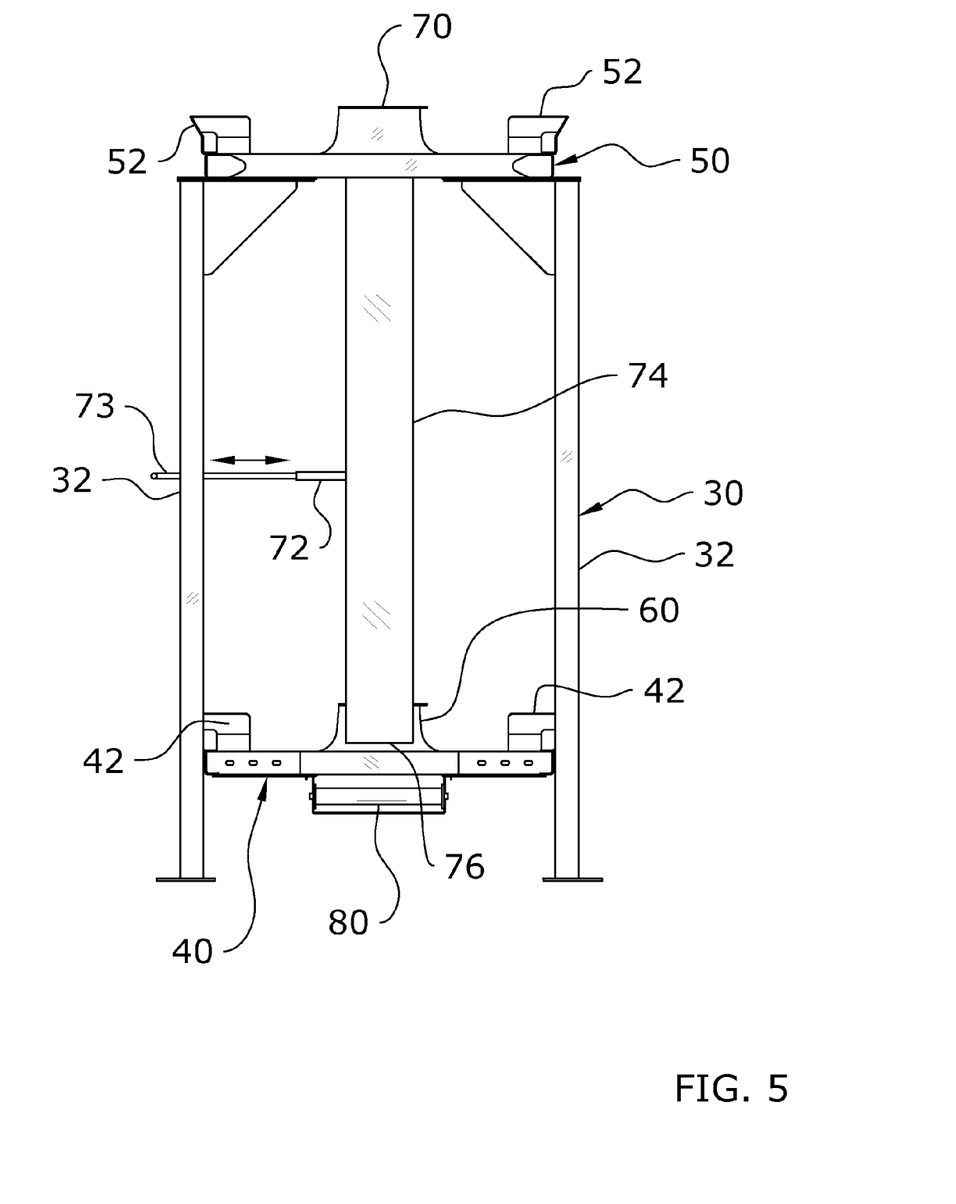
FIG. 5 is a front end view of the present invention.
Figure 6:
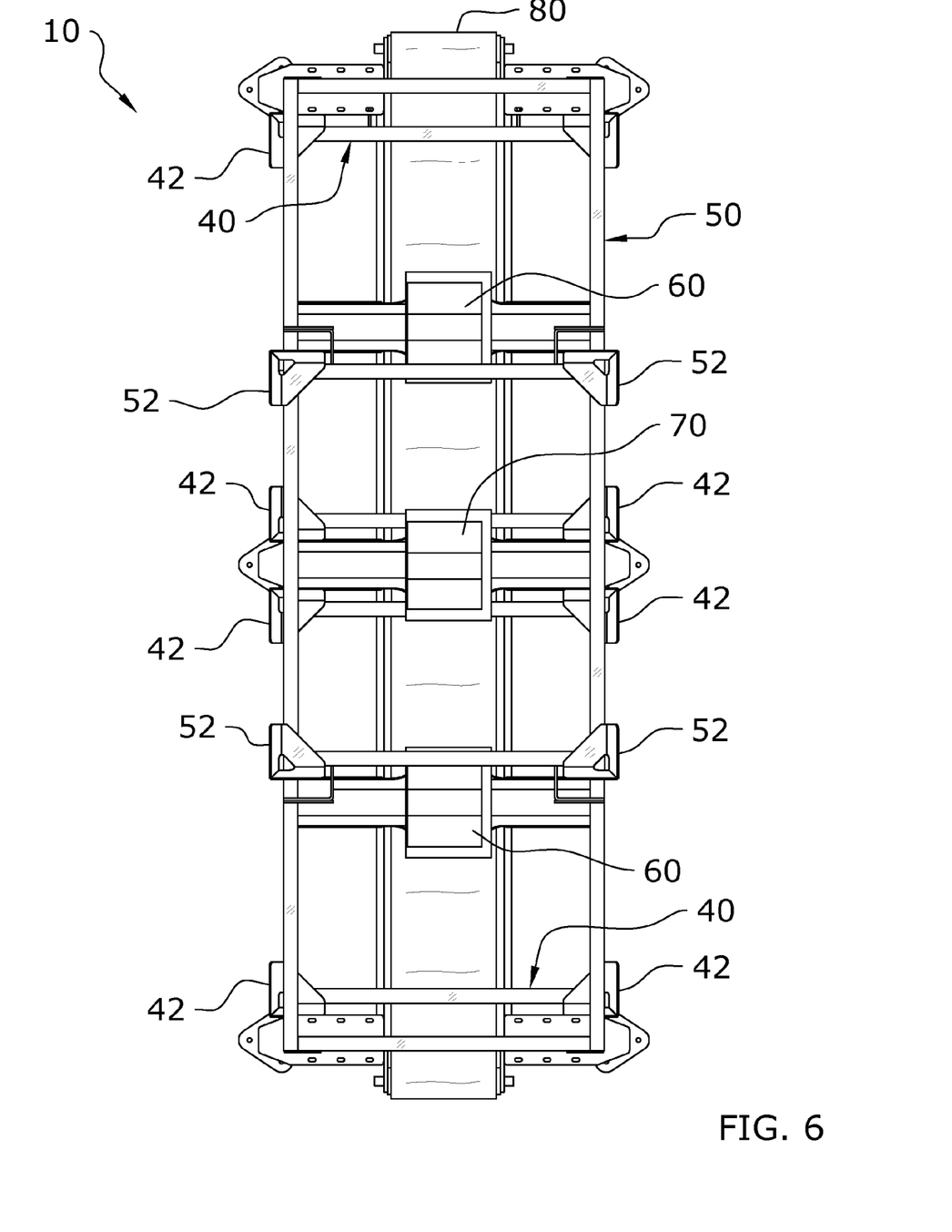
FIG. 6 is a top view of the present invention.

The lower conveyor 80 is attached to the support frame 30 and extends horizontally to receive the seed from the lower seed containers 20 and the upper seed containers 21. The lower conveyor 80 is adapted to be positioned below the lower seed containers 20 when the lower seed containers 20 are positioned upon the lower frame 40 and further preferably below the lower frame 40 as illustrated in FIG. 5 of the drawings. The lower conveyor 80 extends the length of the lower frame 40 to transport the seed from the all of the lower seed containers 20 to a discharge point of the lower conveyor 80. The lower conveyor 80 is preferably comprised of a belt conveyor as illustrated in FIGS. 3 and 5 of the drawings, however, the lower conveyor 80 may be comprised of various other types of conveyors such as but not limited to a bucket conveyor, an auger, a chute and the like.

F. Transfer Conveyor.

FIGS. 1 and 2 illustrate a transfer conveyor 82 that receives the seed from the lower conveyor 80 and transfers the seed to equipment such as seed treatment machines, trucks, planters and the like. The transfer conveyor 82 may be comprised of any type of conveyor such as but not limited to a belt conveyor, a bucket conveyor, an auger, a chute and the like.

G. Operation of Preferred Embodiment.

In use, the user positions one or more lower seed containers 20 on the lower frame 40 of the support frame 30 and one or more upper seed containers 21 on the upper frame 50 of the support frame 30 as illustrated in FIGS. 1 and 2 of the drawings. The seed containers 20, 21 are originally in a closed state with their respective slide discharge doors 25 closed to prevent the seed from passing through the discharge opening 28. The control valves 72 for the corresponding upper funnels 70 are preferably closed initially to prevent the accidental discharge of seed from the upper seed containers 21 onto the lower conveyor 80.

Once the seed containers 20, 21 are properly positioned upon the support frame 30, the user identifies a variety of seed they want and the corresponding seed container 20, 21 that has the selected variety of seed. For example, if the user identifies one of the upper seed containers 21 as having the variety of seed needed, the user would first open the slide discharge door 25 of the selected upper seed container 21 and then open the corresponding control valve 72 thereby allowing the seed from the selected upper seed container 21 to be transferred through the discharge conveyor 74 to the lower conveyor 80. The lower conveyor 80 then transfers the seed to the transfer conveyor 82 or other device for usage. Once the desired amount of seed has been transferred, the user then closes the slide discharge door 25 of the selected upper seed container 21 and then closes the corresponding control valve 72. The same process applies to the lower seed containers 20 and may be utilized with more than one seed container 20, 21 at a time.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A seed container rack system, comprising:
   a support frame, wherein said support frame includes a lower frame adapted to support a plurality of lower seed containers and an upper frame adapted to support an upper seed container, wherein said upper frame supports said upper seed container above an upper end of said plurality of lower seed containers; and
   a discharge conveyor having an upper open end and a lower discharge end, wherein said upper open end is adapted to be aligned with and below a discharge opening of said upper seed container to transfer seed from said upper seed container, wherein said discharge conveyor is adapted to be positioned between two of said plurality of lower seed containers.

2. The seed container rack system of claim 1, wherein said discharge conveyor is comprised of a chute conveyor.

3. The seed container rack system of claim 1, wherein said upper frame is adapted to support a plurality of upper seed containers.

4. The seed container rack system of claim 1, wherein said upper frame is adapted to support said upper seed container in a staggered and non-aligned position along a horizontal axis with respect to said plurality of lower seed containers.

5. The seed container rack system of claim 1, wherein said upper frame is adapted to support said upper seed container so that a central vertical axis of said upper seed container extends to a side of at least one of said plurality of lower seed containers.

6. The seed container rack system of claim 1, wherein said upper frame is adapted to support said upper seed container so that said discharge opening of said upper seed container extends to a side of at least one of said plurality of lower seed containers.

7. The seed container rack system of claim 1, wherein said upper end of said discharge conveyor includes an upper funnel adapted to be positioned beneath a discharge opening of said upper seed container.

8. The seed container rack system of claim 7, wherein said upper end of said discharge conveyor includes a control valve adapted to selectively close and open said upper end of said discharge conveyor.

9. The seed container rack system of claim 7, including a lower funnel adapted to be positioned beneath a discharge opening of each of said plurality of lower seed containers.

10. A seed container rack system, comprising:
    a support frame, wherein said support frame includes a lower frame adapted to support a plurality of lower seed containers and an upper frame adapted to support an upper seed container, wherein said upper frame supports said upper seed container above an upper end of said plurality of lower seed containers;
    a discharge conveyor having an upper open end and a lower discharge end, wherein said upper open end is adapted to be aligned with and below a discharge opening of said upper seed container to transfer seed from said upper seed container, wherein said discharge conveyor is adapted to be positioned between two of said plurality of lower seed containers; and
    a lower conveyor attached to said support frame, wherein said lower conveyor extends horizontally and is adapted to be positioned below said lower seed container when said lower seed container is positioned upon said lower frame.

11. The seed container rack system of claim 10, wherein said discharge conveyor is comprised of a chute conveyor.

12. The seed container rack system of claim 10, wherein said upper frame is adapted to support a plurality of upper seed containers.

13. The seed container rack system of claim 10, wherein said upper frame is adapted to support said upper seed container in a staggered and non-aligned position along a horizontal axis with respect to said plurality of lower seed containers.

14. The seed container rack system of claim 10, wherein said upper frame is adapted to support said upper seed container so that a central vertical axis of said upper seed container extends to a side of at least one of said plurality of lower seed containers.

15. The seed container rack system of claim 10, wherein said upper frame is adapted to support said upper seed container so that said discharge opening of said upper seed container extends to a side of at least one of said plurality of lower seed containers.

16. The seed container rack system of claim 10, wherein said upper end of said discharge conveyor includes an upper funnel adapted to be positioned beneath a discharge opening of said upper seed container.

17. The seed container rack system of claim 16, wherein said upper end of said discharge conveyor includes a control valve adapted to selectively close and open said upper end of said discharge conveyor.

18. The seed container rack system of claim 16, including a lower funnel adapted to be positioned beneath a discharge opening of each of said plurality of lower seed containers.

\* \* \* \* \*